Feb. 9, 1960  L. W. SCOTT, SR  2,924,347
DOUBLE END GATE RAMP AND TRAILER
Filed April 12, 1957  2 Sheets-Sheet 2
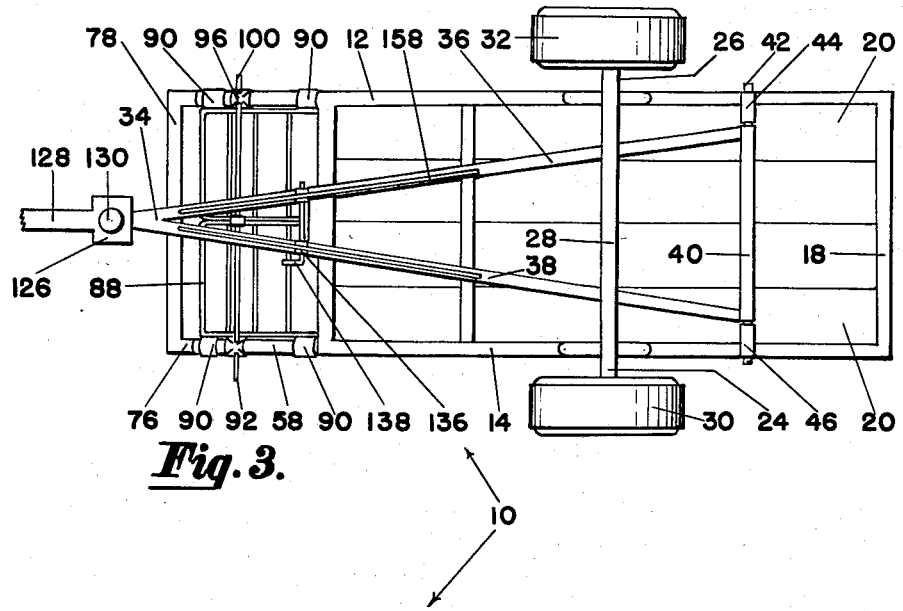
Fig. 3.
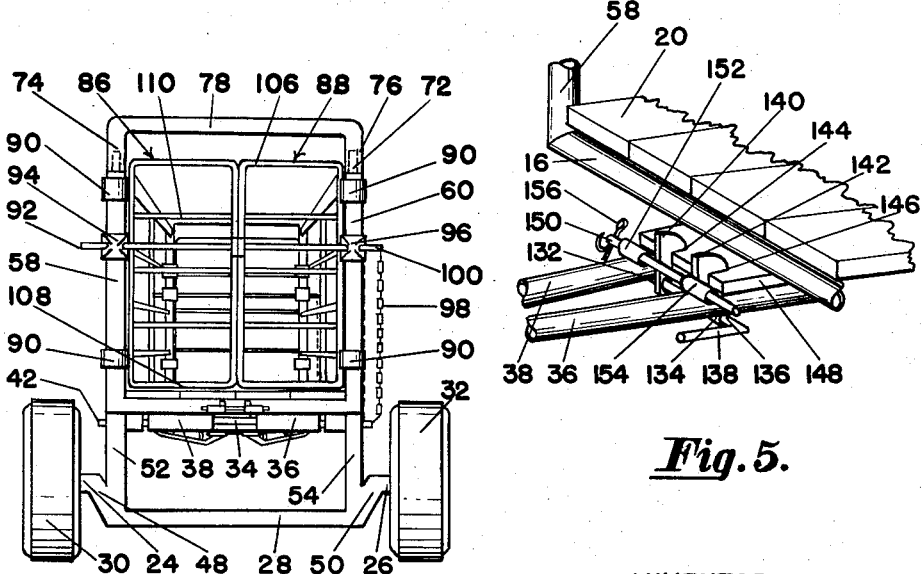
Fig. 4.
Fig. 5.
INVENTOR
L. W. Scott, Sr.
BY
Attorney

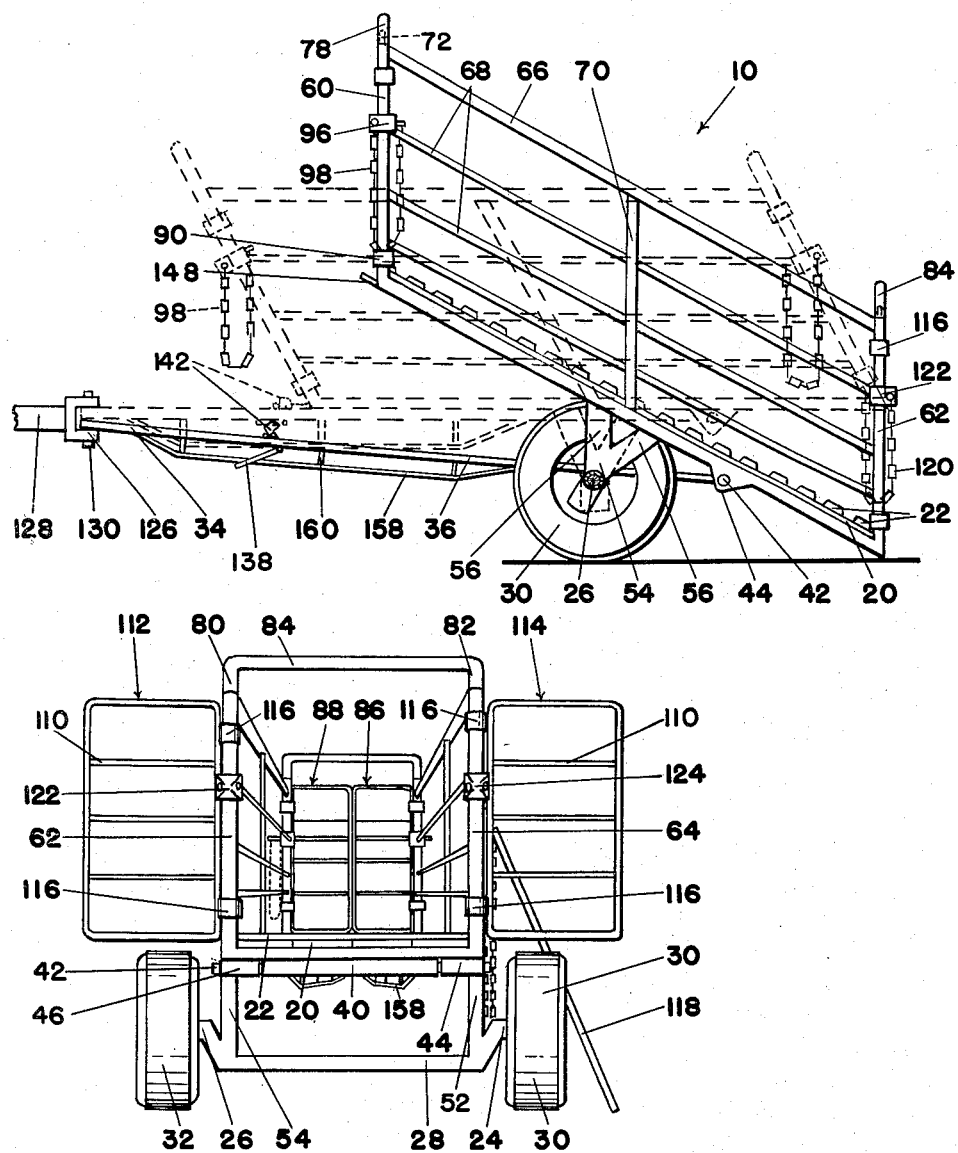

United States Patent Office 2,924,347
Patented Feb. 9, 1960

2,924,347

DOUBLE END GATE RAMP AND TRAILER

Leroy W. Scott, Sr., Lenora, Kans., assignor of one-fourth to Ralph C. Bethell and one-fourth to Albert H. Pratt, both of Hill City, Kans.

Application April 12, 1957, Serial No. 652,469

6 Claims. (Cl. 214—506)

This invention relates to loading and transportation of livestock, and in particular a two wheel tilting trailer wherein the floor or platform thereof may be tilted to an inclined position for use as a chute in loading, and wherein the floor is pivoted substantially midway of the length thereof so that as livestock pass over or straddle the center or pivot point the floor swings to a horizontal position for traveling, and wherein gates are provided at both ends so that livestock may travel straight through thereby obviating the necessity of the livestock turning in the chute or trailer.

The purpose of this invention is to facilitate loading livestock into a trailer, and also to provide a tilting trailer that is designed to be used as a chute for loading livestock into a truck or trailer body.

Trailers for hauling livestock and the like are provided with horizontally disposed floors or platforms, and when loading stock therein tailgates or ramps are dropped at the rear and, because of the height of the floor of the trailer the ramps or the like are comparatively steep. It is difficult to persuade livestock to walk up a steep ramp, and consequently, considerable time is lost in persuading the livestock to enter trailers and the like.

With this thought in mind this invention contemplates a trailer having an axle with a low intermediate portion, and in which the trailing end of the floor or platform drops downwardly until it is positioned on the ground when it is desired to load livestock therein.

The object of this invention is, therefore, to provide means for mounting a trailer body on a pair of wheels so that the rear end of the floor of the body drops to the ground as stock are loaded therein, and whereby the floor drops to a horizontal position as the stock travels over the axis of the axle on which the wheels are carried.

Another object of the invention is to provide a tilting trailer for livestock in which gates are provided at both ends so that the livestock may walk through the trailer.

Another important object of the invention is to provide a trailer for livestock having a tilting body in which the body is actuated by a tongue extended from the forward end to a point between the wheels and the rear end of the body.

It is yet another object of the invention to provide a trailer having a tilting body in which latching means is provided for retaining the body in a horizontal position.

A further object of the invention is to provide a trailer for livestock in which posts of rails at the sides of the body or platform are disposed in vertical positions when the floor or platform is in an inclined position wherein one end is resting upon the ground.

A still further object is to provide a trailer for livestock in which one end of the body tilts downwardly to rest upon the ground for loading in which the intermediate part of the axle drops downwardly to reduce the angle of inclination of the floor or platform with the rear end resting upon the ground.

And a still further object is to provide a trailer having a tilting body wherein the rear end drops to the ground to facilitate loading, and in which the trailer may be used as a cattle chute to facilitate loading a truck or trailer in which the device is of a simple and economical construction.

With these and other objects and advantages in view the invention embodies a platform providing a floor, rails at the sides of the floor, inclined posts extended upwardly at an angle from the floor and providing supporting means for the rails, an axle having a downwardly postioned intermediate section extended below the floor, wheels on ends of the axle, a pair of gates at each end of the floor and hinged to end posts of the rails, latching means for the gates, and a tongue pivotally connected to the rear portion of the floor and extended beyond the forward end thereof.

Other features and advantages of the invention will appear from the following description taken in connection with the drawings, wherein:

Figure 1 is a side elevational view of the trailer showing the body in an inclined or loading position in full lines and in a horizontal position for traveling in broken lines.

Figure 2 is an end elevational view of the trailer with the floor in a horizontal position, and showing the gates at one end in open positions.

Figure 3 is a view looking upwardly toward the lower surface of the trailer.

Figure 4 is an end elevational view of the trailer also with the floor in a horizontal position, and showing the gates closed.

Figure 5 is a view illustrating the latching elements for retaining the forward end of the floor to the tongue of the trailer showing the parts separated and with parts of the floor and tongue broken away.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 indicating side rails of a frame with end rails 16 and 18 connecting ends of the side rails, numeral 20 a floor including longitudinally disposed boards or the like with transversely positioned cleats 22 thereon, numerals 24 and 26 ends of an axle having a drop section 28 therein, numerals 30 and 32 wheels rotatably mounted on the ends of the axle, and numeral 34 a tongue having diverging bars 36 and 38 extended therefrom, the extended ends of the bars being integral with a sleeve 40 rotatably mounted on a rod 42 that is mounted in bearings 44 and 46 on the side rails 12 and 14.

The drop section 28 of the axle is connected to the ends 24 and 26 with sloping sections 48 and 50, and arms 52 and 54 extend upwardly from the sloping sections. The arms are provided with bifurcated upper ends 56 which are connected to the side rails 12 and 14, as shown in Figure 1.

The ends of the end rail 16 at the forward end of the floor extend upwardly at an angle, less than a right angle, providing posts 58 and 60, and similar posts 62 and 64 extend upwardly from the ends of the end rail 18 at the rear end of the body. The upper ends of the posts are connected by upper rails 66, and intermediate rails 68 extend between intermediate parts of the posts. The upper and intermediate rails are reinforced by braces 70 which extend upwardly from the side rails.

The upper ends of the posts 58 and 60 are provided with pins 72 that are positioned in sockets in lower ends of depending sections 74 and 76 of upper cross rail 78, whereby the cross rail is removably mounted on the posts, so that the cross rail may be removed and replaced as desired. The upper ends of the posts 62 and 64 are provided with similar pins which extend into sockets in depending sections 80 and 82 of a cross rail 84 at the rear end of the trailer. The cross rail 84 may also be removed and replaced as desired.

The forward end of the trailer is provided with gates 86 and 88 which are pivotally mounted on the posts 58 and 60 with hinges 90, and the gates are retained in closed positions with a bar 92 that extends through sockets 94 and 96 on the posts, as shown in Figure 4. The bar 92 is connected to the frame of the trailer with a chain 98 that is connected to one end of the bar, as shown at the point 100. The gates are formed with continuous rods having side sections 102 and 104 and end sections 106 and 108, and the side sections are connected with intermediate rods 110.

The rear end of the trailer is provided with similar end gates 112 and 114, and the gates 112 and 114 are pivotally connected to the posts 62 and 64 with hinges 116. The gates 112 and 114 are retained in closed positions by a rod 118 which is held to the trailer frame with a chain 120, and the rod 118 is extended through sockets 122 and 124 on the posts 62 and 64 to retain the gates in closed positions.

The forward end of the tongue 34 is secured in a clevis 126 on a tow bar 128 of a truck, motor vehicle, or the like, by a pin 130. The under surfaces of the bars 36 and 38 are provided with eyes 132 and 134 through which a pin 136, having a handle 138 on one end extends, and latches 140 and 142, mounted on the pin, extend upwardly and jaws 144 and 146 thereof, are positioned to snap over a plate 148 extended from the floor of the trailer body. The latches are locked in the latching positions by a rod 150 extended through sleeves 152 and 154 on the upper surfaces of the bars 36 and 38, as shown in Figure 5. The rod 150 and also the pin 136 are retained in the sleeves and eyes by cotter pins 156 or the like.

As illustrated in Figure 1, the bars 36 and 38 are reinforced by truss formations including rods 158 and struts 160.

Operation

With the parts assembled as illustrated and described the double end gate ramp and trailer of this invention is used in the conventional manner with the body of the trailer in a horizontal position, as indicated by the broken lines in Figure 1, and when it is desired to load livestock, such as a steer, in the trailer, the body is tilted to the position shown in full lines in Figure 1, wherein the rear end is upon the ground and, with the gates at the rear open, the steer is driven up the inclined floor and when the steer straddles the axle the weight of the forward portion of the steer overbalances the rear portion with the result that the body of the trailer tilts back to the horizontal position.

As the floor of the trailer body approaches the horizontal position the plate 148 snaps over the latches 140 and 142 with the rod 150 removed, and with the latches extended over the plate the rod is returned, and the rod is retained in the locking position by cotter pins or the like.

With the gates at both ends of the trailer body livestock may be loaded at one end and discharged from the opposite end, and furthermore, with the gates at both ends the device may be used as a cattle chute with the upper end resting upon the end of a platform of a truck or trailer whereby the livestock may readily be driven into a truck or trailer body, and also readily unloaded therefrom.

The device is also designed to be used for transporting individual steers or other livestock from one location to another.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A trailer comprising a floor having side rails extending upwardly from the sides thereof, gates hinged at the ends of the side rails providing closures for the trailer, an axle having a drop section in the intermediate part mounted on and depending from the floor of the trailer, the axle being positioned midway of the length of the floor upon which the trailer is mounted, wheels mounted on ends of the axle, a tongue positioned below the floor, pivotally connected to the rear portion of the trailer and extended forwardly from the forward end of the trailer, the tongue being extended through and within the drop section of the axle, and latching means for retaining the floor and side rails in horizontally disposed positions.

2. A trailer comprising a floor having side rails extending upwardly from the sides thereof, gates hinged at the ends of the side rails, means for locking the gates in closed positions for closing the body of the trailer, an axle having a dropsection therein mounted on the floor of the trailer and positioned midway of the length thereof, wheels rotatably mounted on ends of the axle, a tongue extended through and within the drop section of the axle, pivotally mounted on the under surface of the floor, and extended forwardly from the trailer body, and latches mounted on the tongue and positioned to retain the floor of the trailer in a horizontal position.

3. A tilting trailer comprising a floor having transversely disposed cleats on the upper surface, posts extended upwardly from corners of the floor, rails positioned parallel to the floor extended between the posts, a pair of gates hinged to the posts at both ends of the trailer, means for locking the gates in closed positions, an axle having a drop section therein positioned midway of the length of the floor and upon which the trailer is mounted, wheels positioned on ends of the axle, and a tongue pivotally connected to the rear portion of the floor at a point spaced to the rear of the longitudinal center thereof whereby the floor is tilted by the tongue, the tongue being extended forwardly from the forward end of the trailer floor, the tongue being extended through and within the drop section of the axle.

4. In a combination trailer and ramp, a floor having transversely disposed cleats thereon, an axle having a drop section in the intermediate portion mounted on the lower surface of the floor and positioned midway of the length thereof, wheels rotatably mounted on ends of the axle, a tongue extended through and within the drop section of the axle, pivotally connected to the rear portion of the floor and extended forwardly from the forward end of the floor, a latch mounted on the tongue and positioned to retain the floor in a horizontal position, posts extended vertically from corners of the floor with the floor in an inclined position, side rails extended between the posts, and gates positioned at both ends of the floor.

5. In a trailer and ramp, the combination which comprises a floor, an axle having a drop section in the intermediate portion mounted on the under surface of the floor, wheels rotatably mounted on ends of the axle, a tongue extended through and within the drop section of the axle, pivotally connected to the under surface of the floor at a point spaced rearwardly from said axle, and extended forwardly from the forward end of the floor, said floor being mounted whereby the rear end thereof drops downwardly to the ground upon which the wheels are positioned, posts extended upwardly from the floor, side rails extended between the posts, gates positioned in both ends of the device and hinged to the posts, means for locking the gates in closed positions, and latch means for retaining the floor in a horizontal position, the posts being positioned vertically with the floor in an inclined position.

6. In a trailer and cattle chute, the combination which comprises a floor including side rails connected by cross members and having longitudinally disposed members with cleats thereon secured to said rails, posts extended upwardly from ends of the side rails, spaced parallel side rails extended between the posts, gates hinged on the posts for closing ends of the chute, rods extended through sockets on the posts for locking the gates in closed positions, chains connecting the rods to the posts, an axle having a drop section in the intermediate portion mounted on the side rails from which the posts extend and extended downwardly therefrom, wheels rotatably mounted on ends of the axle, a tongue extended through and within the drop section of the axle, pivotally connected to the rear portion of the floor, and extended forwardly from the forward end thereof, and a latch mounted on the tongue for locking the floor in a horizontal position.

References Cited in the file of this patent
UNITED STATES PATENTS

| | | |
|---|---|---|
| 840,021 | Sharpe | Jan. 1, 190 |
| 857,029 | Cleveland | June 18, 190 |
| 2,610,865 | Cantrell | Sept. 16, 195 |
| 2,754,802 | Patterson | July 17, 195 |